United States Patent [19]
Amano et al.

[11] Patent Number: 6,136,904
[45] Date of Patent: Oct. 24, 2000

[54] NEAR INFRARED ABSORBENT POLYCARBONATE RESIN COMPOSITION AND SHAPED ARTICLE THEREOF

[75] Inventors: Satoshi Amano; Shun Hasegawa; Gen Masuda, all of Tokyo, Japan

[73] Assignee: Nisshinbo Industries, Inc., Tokyo, Japan

[21] Appl. No.: 09/265,372

[22] Filed: Mar. 10, 1999

[30] Foreign Application Priority Data

Mar. 11, 1998 [JP] Japan ................................ 10-080178

[51] Int. Cl.[7] ...................................................... C08K 5/17
[52] U.S. Cl. ............................................................. 524/236
[58] Field of Search ............................................. 524/236

[56] References Cited

U.S. PATENT DOCUMENTS 3,557,012  1/1971  Tucker ..................................... 524/236

*Primary Examiner*—Kriellion Sanders
*Attorney, Agent, or Firm*—Kubovcik & Kubovcik

[57] ABSTRACT

A near infrared absorbent polycarbonate resin composition comprising a polycarbonate resin and a diimmonium type near infrared absorber. In this resin composition, not only the diimmonium type near infrared absorber shows a near infrared absorptivity but also its thermal stability is improved; therefore, the resin composition can be used in such applications as the heat resistance of near infrared absorbent material is required, and can withstand long-term use as compared with conventional near infrared absorbent materials containing a diimmonium type near infrared absorber.

11 Claims, No Drawings

NEAR INFRARED ABSORBENT POLYCARBONATE RESIN COMPOSITION AND SHAPED ARTICLE THEREOF

BACKGROUND OF THE INVENTION (1) Field of the Invention

The present invention relates to a near infrared absorbent polycarbonate resin composition and a shaped article thereof. More particularly, the present invention relates to a near infrared absorbent polycarbonate resin composition using a diimmonium type near infra red absorber, wherein the thermal stability of the diimmonium type near infra red absorber is improved so as to allow its long-term use even at high temperatures; as well as to a shaped article made of the resin composition.

(2) Description of the Prior Art

In recent years, infrared or near infrared absorption filters have found wider applications.

As the material for such infrared or near infrared absorption filters, there have heretofore been used a glass containing metal oxides such as ferric oxide, copper oxide etc., or a glass which surface is coated with a thin layer or layers of a metal or metal oxide. Recently, however, there has come to be used a shaped article of a resin composition comprising an easily shapeable lightweight transparent resin and a near infrared absorber.

Infrared or near infrared absorbent glass filters mentioned as above, however, are inconvenient to handle, since thye are heavy and crack easily. Also they are difficult to process by, for example, bending or punching.

Also, infrared or near infrared absorbent filters made of a resin composition comprising a transparent resin and a near infrared absorber are low in reliability in long-term use and, when used for a long period of time under severe conditions (e.g. high temperature and high humidity) come to show changed absorbing wavelength range because of degradation or decomposition of the near infrared absorber.

Of near infrared absorbers, on the other hand, diimmonium type near infrared absorbers show almost no absorption in a visible region, but wide range of absorption in near infrared and infrared region, which satisfy the requirements for infrared or near infrared absorbent filter. Meanwhile, the diimmonium type near infrared absorbers are known to be unstable to heat and have had various problems to be solved.

The present inventors made a study on the stability of diimmonium type near infrared absorbers in various resins, and found out that their stability particularly in polycarbonate resin are very high as compared with the stability in other resins. The present inventors made a further study and completed the present invention.

SUMMARY OF THE INVENTION

The present invention is intended to alleviate the above-mentioned problems of the prior art and provide (1) a near infrared absorbent polycarbonate resin composition using a diimmonium type near infrared absorber, wherein the thermal stability of the diimmonium type near infra red absorber is improved so as to allow its long-term use even at high temperatures and (2) a shaped article made of the resin composition.

According to the present invention there is provided a near infrared absorbent polycarbonate resin composition comprising a polycarbonate resin and a diimmonium type near infrared absorber.

According to the present invention there is also provided a polycarbonate resin shaped article made of the above near infrared absorbent polycarbonate resin composition.

According to the present invention there is also provided a method for improving the thermal stability of a diimmonium type near infrared absorber, which comprises adding the diimmonium type near infrared absorber to a polycarbonate resin.

DETAILED DESCRIPTION OF THE INVENTION

The present invention is hereinafter described in detail.

As mentioned above, the near infrared absorbent polycarbonate resin composition of the present invention comprises a polycarbonate resin and a near infrared absorber. As to the polycarbonate resin, there is no particular restriction, and it may be an ordinary polycarbonate resin.

The near infrared absorber used in the present near infrared absorbent polycarbonate resin composition is a diimmonium type compound generally represented by the following formula:

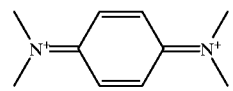

Specific examples of the diimmonium type near infrared absorber include a compound represented by the following formula:

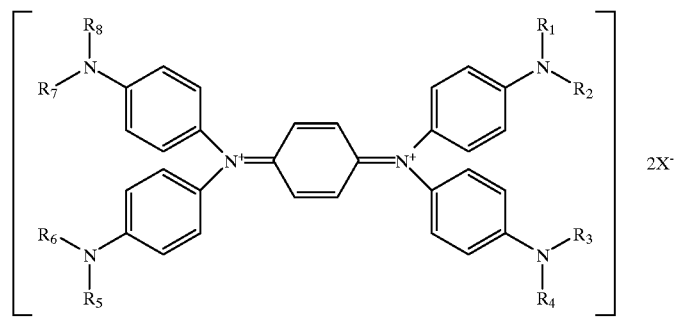

In the above formula, $R_1$ to $R_8$ may be the same or different and are each a hydrogen atom; an alkyl group of 1 to 12 carbon atoms such as methyl group, ethyl group, propyl group, butyl group, pentyl group, hexyl group or the like; or an aryl group of 6 to 12 carbon atoms such as phenyl group, biphenyl group or the like.

In the above formula, X is a counter ion such as $SbF_6^-$, $ClO_4^-$, $AsF_6^-$, $BF_4^-$, halogen ion (e.g. $I^-$), $NO_3^-$,

or the like.

The diimmonium type near infrared absorber may be used singly or in a combination of two or more kinds.

In the near infrared absorbent polycarbonate resin composition of the present invention, the amount of the diimmonium type near infrared absorber used can be, for example, 0.01 to 50% by weight based on the polycarbonate resin.

When the amount of the diimmonium type near infrared absorber used is far less than 0.01% by weight, the near infrared absorptivity of the compound is too low. When the amount is more than 50% by weight, the near infrared absorber may separate out from the shaped article, or, show changed absorbing wavelength range because the near infrared absorber is too dense and may begin degradation or decomposition. Thus, in such amounts, the compound is unable to satisfy its requirements.

There is no particular restriction as to the method for adding the diimmonium type near infrared absorber to the polycarbonate resin. The diimmonium type near infrared absorber can be added to the polycarbonate resin by an ordinary method and then dissolved or dispersed therein.

The present near infrared absorbent polycarbonate resin composition constituted as above has a near infrared absorptivity in a specific wavelength range of 800 to 1,500 nm.

In the present near infrared absorbent polycarbonate resin composition, the stability (particularly the heat resistance) of the diimmonium type near infrared absorber is very high. Therefore, the present invention provides a method for improving the thermal stability of a diimmonium type near infrared absorber.

The polycarbonate resin shaped article of the present invention can be obtained by shaping the present near infrared absorbent polycarbonate resin composition constituted as above. There is no particular restriction as to the method for shaping, and there can be used any shaping method employing no heating, such as casting, spin coating, dipping or the like.

During production of the present near infrared absorbent polycarbonate resin composition or the present polycarbonate resin shaped article, there can be added other near infrared absorber, a ultraviolet absorber, a color-adjusting agent, a dye, an antioxidant for resin, etc.

DESCRIPTION OF PREFERRED EMBODIMENTS

The present invention is described in more detail below by way of Examples.

EXAMPLE 1

In 100 parts by weight of chloroform were dissolved 13.3 parts by weight of a polycarbonate resin and 0.33 part by weight of a diimmonium compound represented by the following formula:

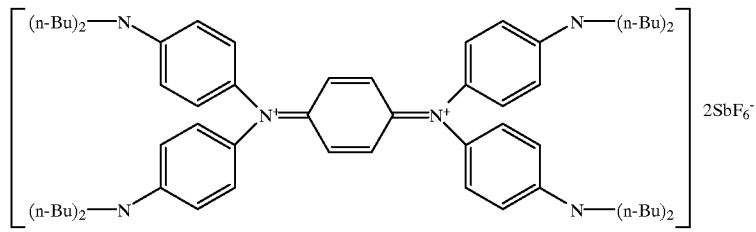

(each diimmonium compound mentioned hereinafter means this diimmonium compound). The resulting solution was coated on a polyester film by casting using a bar coater having a gap of 300 μm, to form a film. The film was measured for light transmittances at wavelengths of 850 nm, 950 nm and 1,050 nm, which were 34.3%, 6.3% and 5.1%, respectively.

The film was subjected to a heat resistance test by allowing to stand in a dryer of 80° C. for 500 hours. The resulting film was again measured for light transmittances at wavelengths of 850 nm, 950 nm and 1,050 nm, which were 34.5%, 6.4% and 5.2%, respectively. Thus, the film showed substantially no deterioration of near infrared absorptivity.

Comparative Example 1

In 100 parts by weight of chloroform were dissolved 13.3 parts by weight of a polyvinyl acetate resin and 0.33 part by weight of a diimmonium compound. The resulting solution was coated on a polyester film by casting using a bar coater having a gap of 300 μm, to form a film. The film was measured for light transmittances at wavelengths of 850 nm, 950 nm and 1,050 nm, which were 19.1%, 1.4% and 1.0%, respectively.

The film was allowed to stand in a dryer of 80° C. for 500 hours. The resulting film was again measured for light transmittances at wavelengths of 850 nm, 950 nm and 1,050 nm, which were 40.3%, 25.8% and 35.9%, respectively. Thus, the film showed deterioration of near infrared absorptivity.

Comparative Example 2

In 100 parts by weight of chloroform were dissolved 13.3 parts by weight of a phenoxy resin and 0.33 part by weight of a diimmonium compound. The resulting solution was coated on a polyester film by casting using a bar coater having a gap of 300 μm, to form a film. The film was measured for light transmittances at wavelengths of 850 nm, 950 nm and 1,050 nm, which were 17.8%, 4.2% and 4.1%, respectively.

The film was allowed to stand in a dryer of 80° C. for 500 hours. The resulting film was again measured for light transmittances at wavelengths of 850 nm, 950 nm and 1,050 nm, which were 38.2%, 29.9% and 32.1%, respectively. Thus, the film showed deterioration of near infrared absorptivity.

Comparative Example 3

In 100 parts by weight of chloroform were dissolved 13.3 parts by weight of a polyester resin and 0.33 part by weight of a diimmonium compound. The resulting solution was coated on a polyester film by casting using a bar coater having a gap of 300 μm, to form a film. The film was measured for light transmittances at wavelengths of 850 nm, 950 nm and 1,050 nm, which were 13.0%, 3.3% and 2.5%, respectively.

The film was allowed to stand in a dryer of 80° C. for 500 hours. The resulting film was again measured for light transmittances at wavelengths of 850 nm, 950 nm and 1,050 nm, which were 37.4%, 28.8% and 32.7%, respectively. Thus, the film showed deterioration of near infrared absorptivity.

EXAMPLE 2

In 100 parts by weight of chloroform were dissolved 13.3 parts by weight of a polycarbonate resin, 0.33 part by weight of a diimmonium compound and 0.06 part by weight of a color-adjusting agent (Kayaset Black, a product of Nippon Kayaku Co., Ltd.). The resulting solution was coated on a polyester film by casting using a bar coater having a gap of 300 μm, to form a film. The film was measured for light transmittances at wavelengths of 850 nm, 950 nm and 1,050 nm, which were 30.8%, 5.6% and 4.8%, respectively.

The film was subjected to a heat resistance test by allowing to stand in a dryer of 80° C. for 500 hours. The resulting film was again measured for light transmittances at wavelengths of 850 nm, 950 nm and 1,050 nm, which were 31.0%, 5.8% and 4.9%, respectively. Thus, the film showed substantially no deterioration of near infrared absorptivity.

Comparative Example 4

In 100 parts by weight of chloroform were dissolved 13.3 parts by weight of a polyvinyl acetate resin, 0.33 part by weight of a diimmonium compound and 0.06 part by weight of a color-adjusting agent (Kayaset Black, a product of Nippon Kayaku Co., Ltd.). The resulting solution was coated on a polyester film by casting using a bar coater having a gap of 300 μm, to form a film. The film was measured for light transmittances at wavelengths of 850 nm, 950 nm and 1,050 nm, which were 21.7%, 2.1% and 1.6%, respectively.

The film was allowed to stand in a dryer of 80° C. for 500 hours. The resulting film was again measured for light transmittances at wavelengths of 850 nm, 950 nm and 1,050 nm, which were 48.7%, 40.0% and 48.0%, respectively. Thus, the film showed deterioration of near infrared absorptivity.

Comparative Example 5

In 100 parts by weight of chloroform were dissolved 13.3 parts by weight of a phenoxy resin, 0.33 part by weight of a diimmonium compound and 0.06 part by weight of a color-adjusting agent (Kayaset Black, a product of Nippon Kayaku Co., Ltd.). The resulting solution was coated on a polyester film by casting using a bar coater having a gap of 300 μm, to form a film. The film was measured for light transmittances at wavelengths of 850 nm, 950 nm and 1,050 nm, which were 19.2%, 4.3% and 4.2%, respectively.

The film was allowed to stand in a dryer of 80° C. for 500 hours. The resulting film was again measured for light transmittances at wavelengths of 850 nm, 950 nm and 1,050 nm, which were 61.4%, 50.5% and 58.3%, respectively. Thus, the film showed deterioration of near infrared absorptivity.

Comparative Example 6

In 100 parts by weight of chloroform were dissolved 13.3 parts by weight of a polyester resin, 0.33 part by weight of a diimmonium compound and 0.06 part by weight of a color-adjusting agent (Kayaset Black, a product of Nippon Kayaku Co., Ltd.). The resulting solution was coated on a polyester film by casting using a bar coater having a gap of 300 μm, to form a film. The film was measured for light transmittances at wavelengths of 850 nm, 950 nm and 1,050 nm, which were 15.3%, 5.0% and 5.0%, respectively.

The film was allowed to stand in a dryer of 80° C. for 500 hours. The resulting film was again measured for light transmittances at wavelengths of 850 nm, 950 nm and 1,050 nm, which were 53.6%, 40.2% and 51.5%, respectively. Thus, the film showed deterioration of near infrared absorptivity.

Thus, in the present near infrared absorbent polycarbonate resin composition comprising a polycarbonate resin and a diimmonium type near infrared absorber, not only the diimmonium type near infrared absorber shows a near infrared absorptivity but also its thermal stability is improved; therefore, the resin composition can be used in such applications as the heat resistance of near infrared absorbent material is required.

Further, the present near infrared absorbent polycarbonate resin composition can withstand long-term use as compared with conventional near infrared absorbent material containing a diimmonium type near infrared absorber.

What is claimed is:

1. A near infrared absorbent polycarbonate resin composition comprising a polycarbonate resin and a diimmonium type near infrared absorber.

2. A near infrared absorbent polycarbonate resin composition according to claim 1, wherein the diimmonium type near infrared absorber contains a structure represented by the following formula:

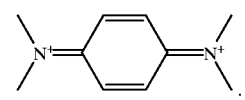

3. A near infrared absorbent polycarbonate resin composition according to claim 2, wherein the diimmonium type near infrared absorber is represented by the following formula:

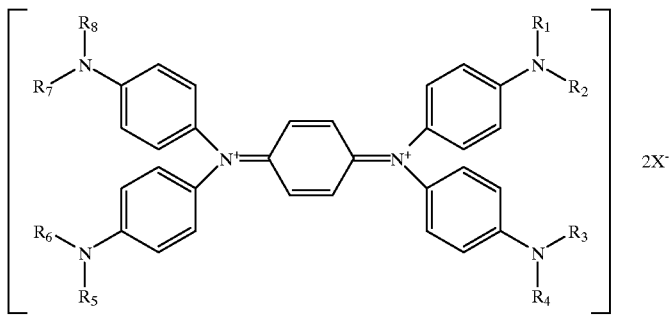

wherein $R_1$ to $R_8$ may be the same or different and are each a hydrogen atom, an alkyl group of 1 to 12 carbon atoms or an aryl group of 6 to 12 carbon atoms; and X is a counter ion such as $SbF_6-$, $ClO_4-$, halogen ion or the like.

4. A near infrared absorbent polycarbonate resin composition according to claim 1, wherein the amount of the diimmonium type near infrared absorber is 0.01 to 50% by weight based on the polycarbonate resin.

5. A polycarbonate resin shaped article made of a near infrared absorbent polycarbonate resin composition set forth in claim 1.

6. A method for improving the thermal stability of a diimmonium type near infrared absorer, which comprises adding the diimmonium type near infrared absorber to a polycarbonate resin.

7. A near infrared absorbent polycarbonate resin composition according to claim 2, wherein the amount of the diimmonium type near infrared absorber is 0.01 to 50% by weight base on the polycabonate resin.

8. A near infrared absorbent polycarbonate resin composition according to claim 3, wherein the amount of the diimmonium type near infrared absorber is 0.01 to 50% by weight base on the polycabonate resin.

9. A polycarbonate resin shaped article made of a near infrared absorbent polycarbonate resin composition set forth in claim 2.

10. A polycarbonate resin shaped article made of a near infrared absorbent polycarbonate resin composition set forth in claim 3.

11. A polycarbonate resin shaped article made of a near infrared absorbent polycarbonate resin composition set forth in claim 4.

* * * * *